Dec. 24, 1968   W. A. SMITH   3,417,616
DEVICE FOR MEASURING DEGREE DAYS AND B.T.U.'S
Filed April 18, 1966   2 Sheets-Sheet 1
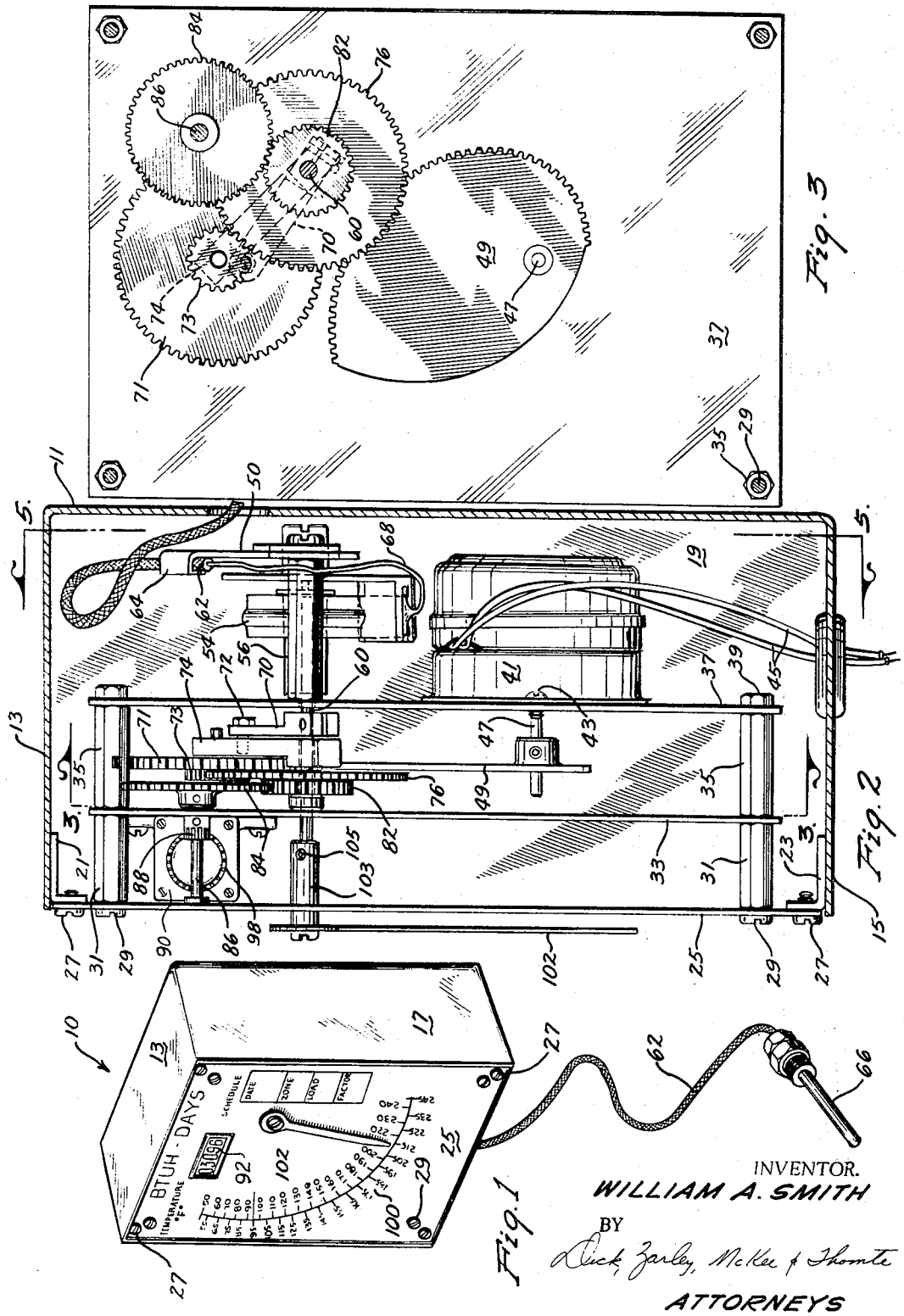
INVENTOR.
WILLIAM A. SMITH
BY
Dick, Zarley, McKee & Thomte
ATTORNEYS Dec. 24, 1968  W. A. SMITH  3,417,616
DEVICE FOR MEASURING DEGREE DAYS AND B.T.U.'S
Filed April 18, 1966  2 Sheets-Sheet 2
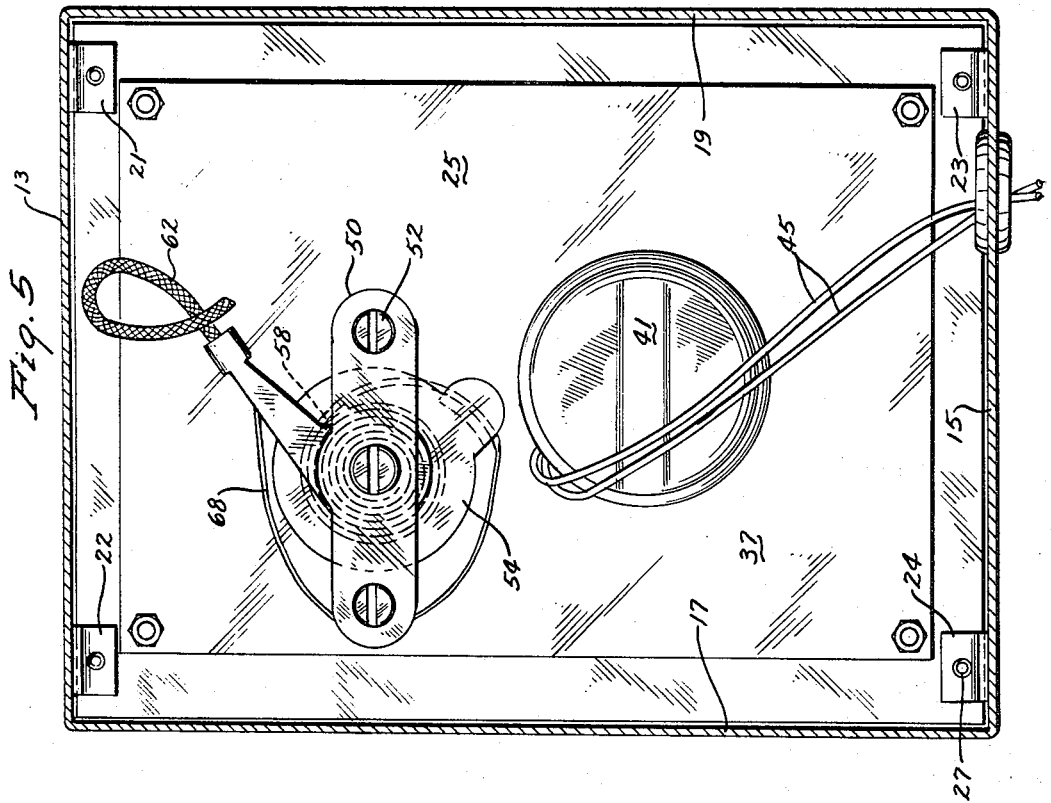
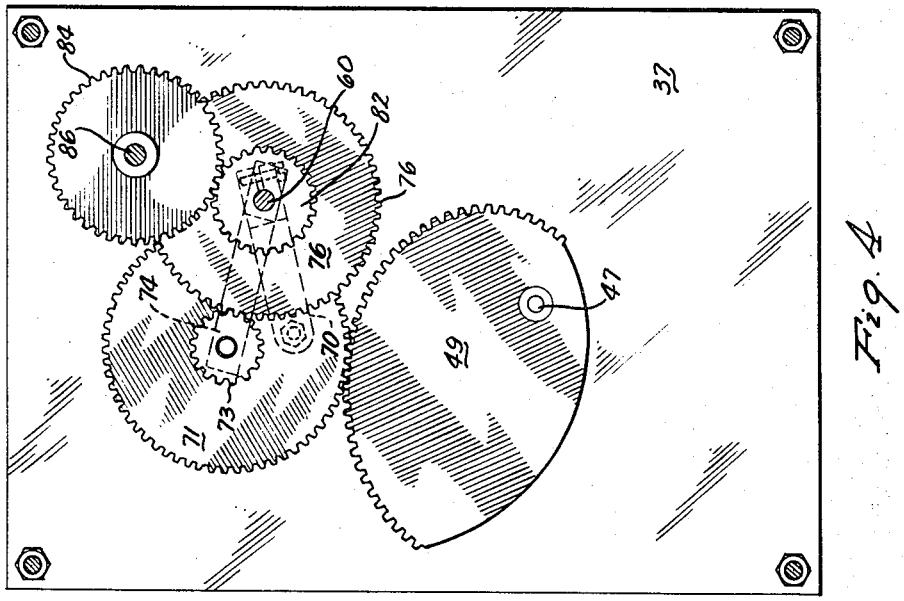
INVENTOR.
WILLIAM A. SMITH
BY
*Zarley, McKee & Thomte*
ATTORNEYS

United States Patent Office

3,417,616
Patented Dec. 24, 1968

3,417,616
DEVICE FOR MEASURING DEGREE DAYS AND B.T.U.'S
William A. Smith, Rte. 3, Newton, Iowa 50208
Continuation-in-part of application Ser. No. 296,591, July 22, 1963. This application Apr. 18, 1966, Ser. No. 543,344
3 Claims. (Cl. 73—339)

ABSTRACT OF THE DISCLOSURE

A device for measuring degree days and B.t.u.'s comprising a supporting means having a temperature responsive means such as a Bourdon tube mounted thereon. The Bourdon tube includes a shaft which is rotated upon a change in temperature. A cam gear is mounted on a power shaft which is rotatably mounted in the supporting means. A limiting arm is fixed to the shaft for rotation therewith and is movable towards and away from the cam gear. An idler gear is mounted on an idler arm which is connected to the limiting arm. The cam gear intermittently meshes with the idler gear between the extreme rotational positions of the idler arm and a counter mechanism is operatively connected to the idler gear whereby the proportional rotational displacement of the idler gear by the cam gear will be recorded when the power shaft is rotated.

---

This application is a continuation-in-part application of Ser. No. 296,591 filed July 22, 1963 now Patent No. 3,282,105.

It is a principal object of this invention to provide a measuring device which measures the degree days of cold.

A further object of this invention is to provide a measuring device which may be used to measure the degree days of heat.

A further object of this invention is to provide a measuring device which integrates time, variable temperatures and a constant fluid flow in gallons or other units of measure per minute to B.t.u. H-day unit of measure.

A further object of this invention is to provide a measuring device which integrates time, variable temperatures and steam pressure to B.t.u. H-day unit of measure.

A further object of this invention is to provide a measuring device which integrates time, variable temperature differential and variable gallons per minute to a cumulative count on B.t.u.'s.

A further object of this invention is to provide a measuring device which integrates time, temperature and steam pressure to a cumulative count of B.t.u.'s.

A further object of this invention is to provide a measuring device which records B.t.u. H-days, the mean average of B.t.u.'s being emitted per hour for one day per square feet of radiation in hydronic, steam or warm air heating systems.

A further object of this invention is to provide a measuring device which records B.t.u. H-days, which may be multiplied by a zone factor to indicate the amount of fuel used, the zone factor being determined by the square feet of radiation in a zone.

A further object of this invention is to provide a measuring device which affords a constant check on fuel storage, rate of fuel consumption, efficiency percent of the heating system and the heating value of the fuel used.

A further object of this invention is to provide a measuring device which is extremely accurate.

A further object of this invention is to provide a measuring device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the measuring device;

FIG. 2 is a sectional view of the measuring device;

FIG. 3 is a sectional view of the device as seen on line 3—3 of FIG. 2, illustrating the relative positions of the various gears at one point of the rotation of the cam means;

FIG. 4 is a sectional view as would be seen on line 3—3 of FIG. 2, illustrating the relationship of the various gears when the cam means is in a second position of its rotation; and FIG. 5 is a sectional view as would be seen on line 5—5 of FIG. 2.

The numeral 10 generally designates a housing having a rearward portion 11, top portion 13, bottom portion 15 and side portions 17 and 19. Flanges 21, 22 and 23, 24 are secured to the forward inside surface of top and bottom portions 13 and 15 respectively by any convenient means. A front portion 25 is secured to housing 10 (FIG. 2) by means of screws 27 and extending through front portion 25 and being threadably received by flanges 21 and 23.

Bolts 29 extend through the front portion 25 into the interior of housing 10 to extend through sleeves 31, suitable apertures in plate 33, sleeves 35 and suitable apertures in plate 37. Nuts 39 on the bolts 29 bind the plates 33 and 37 against the sleeves to maintain the plates in parallel position with respect to the front portion 25.

A synchronous motor 41 is mounted on the lower rearward portion of plate 37 by connectors 43, and is connected to a source of electricity by leads 45 which extend through the bottom 15 of housing 10. The drive shaft 47 of motor 41 rotatably extends through a suitable opening in plate 37 and is adapted to make a predetermined number of revolutions per hour when the motor is electrically excited. A cam gear 49 is rigidly mounted on shaft 47 as best seen in FIGS. 2, 3 and 4.

A bracket 50 is suspended rearwardly of plate 37 by connectors 52 and a Bourdon tube 54 is mounted in conventional fashion on a bearing means 56 which extends rearwardly from the plate 37 and through the bracket 50. The spiraled coils 58 of the Bourdon tube are operatively connected to the shaft 60 which extends through the bearing means 56 so that expansion and construction of the coils will effect rotation of shaft 60 in convenient fashion. The end of an elongated hollow cable shield 62 is rigidly secured to bracket 50 at 64, and the cable shield extends through the housing 10 and is connected to a sensing means 66. An extension 68 of the coils 58 of the Bourdon tube extends from operative communication therewith through the cable shield 62 and sensing means 66. The coils 58 and coil extension 68 are filled with a suitable gas, and when changes or temperature are imposed on sensing means 66, the gas in the coil elements either expands or contracts and causes a corresponding rotation of the shaft 60 which is operatively secured to coils 58. The above described structure is that of a conventional capillary actuated Bourdon tube.

Shaft 60 rotatably extends forwardly from the Bourdon tube through plates 37 and 33. An arm 70 is rigidly secured to shaft 60 just forwardly of plate 37 and a stop screw 72 extends forwardly from the free end thereof. An idler arm 74 is rotatably mounted on shaft 60 just forwardly of arm 70 and a large idler gear 71 is rotatably mounted on the forward side of the free end thereof. A smaller idler gear 73 is rigidly concentrically mounted on the forward side of idler gear 71 for rotation therewith. A counter drive gear 76 is rotatably mounted on shaft 60 and is always in mesh with the teeth of idler gear 73. A reducing counter drive gear 82 is rigidly fixed to and concentrically positioned on the forward face of gear 76. The teeth of gear 82 are in constant mesh with a second counter drive gear 84 which is fixedly secured to shaft 86 which is rotatably mounted on and extends between plate 33 and front portion 25. A counter drive pinion gear 88 is rigidly secured to shaft 86 at a point forwardly of plate 33. A tumbler type counting mechanism 90 of conventional construction with numbered tumblers 92 is secured to the forward side of plate 33. Front portion 25 is provided with a cut-away portion in its face to enable tumblers 92 to be viewed (FIG. 1). A conventional power shaft (not shown) is operatively connected to the tumblers 92 and has a crown gear 98 rigidly secured thereto which is in mesh with pinion gear 88.

An arcuate scale 100 on front portion 25 is concentrically positioned with shaft 60 and a pointer 102 is rigidly secured to the end of collar 103 which extends through front portion 25 and is secured to the forward end of shaft 60 by set screw 105.

The position of arm 70 is determined by the Bourdon tube as it senses the temperature to which sensing means 66 is subjected to. For example, in the embodiment of FIG. 1, when the sensing means 66 is subjected to a temperature of 245° F., the arm 70 would be dropped to its lowest position. When the sensing means 66 is subjected to a temperature of 50° F., the arm 70 would be raised to its highest position. However, when sensing means 66 is subjected to a temperature of 95° F. or below, arm 70 will have raised idler gear 71 out of possible engagement with cam gear 49.

The rotation of shaft 47 causes cam gear 49 to rotate and to engage idler gear 71 somewhere between the opposite ends of the gear teeth on cam gear 49. The time of engagement between cam gear 49 and idler gear 71 will depend upon the position of idler gear 71 which is controlled by arm 70. For example, it can be seen in FIG. 3 that cam gear 49 will engage idler gear 71 at a point near the left end of the gear teeth and will rotate idler gear 71 until the left end of the gear teeth on cam gear 49 has rotated out of engagement therewith. It can be seen in FIG. 4 that arm 70 is in a lower position than illustrated in FIG. 3 which will cause cam gear 49 to engage idler gear 71 at a point closer to the right end of the gear teeth of cam gear 49 than in FIG. 3. It can therefore be seen that the lowering of arm 70 causes cam gear 49 to engage idler gear 71 sooner and to cause increased rotation of idler gear 71. Arm 74 is freely rotatably mounted on shaft 60 to permit idler gear 71 to ride upwardly (FIG. 4) during the time of engagement with cam gear 49.

The rotation of idler gear 71 causes idler gear 73 to also be rotated. Idler gear 73 in turn rotates counter drive gear 76. The rotation of counter drive gear 76 causes counter drive gear 82 to be rotated which in turn causes gear 84, shaft 86, gear 88 and gear 98 to be rotated. The rotation of gear 98 causes the tumblers 92 to be correspondingly moved.

Sensing means 66 may be mounted in any number of different environments such as: (1) A steam pressure line; (2) A hot water line such as employed in heating systems wherein the flow of water is constant or variable and the temperature thereof is constant or variable; (3) A cold water line such as employed in cooling systems wherein the flow of water is constant or variable and the temperature thereof is constant or variable; (4) In hydronic, steam or warm air heating systems; (5) In the atmosphere to measure degree days of cold or heat. The scale 100 and the ratio of the gears will be varied depending upon the environment in which the measuring device is being used.

Thus it can be seen that the temperature is sampled by the cam gear 49 once during each revolution thereof with the tumblers 92 recording such sampling. The tumblers are read and recorded at predetermined times and the figures are applied to known formulas to compute the particular degree days of cold, degree days of heat, B.t.u. H-days of heat or cold, B.t.u.'s emitted by a system, etc.

Thus it can be seen that the device accomplishes at least all of its stated objectives.

Some changes may be made in the construction and arrangement of my Measuring Device without departing from the real spirit and purpose of my invention, and it is my intention to cover by my claims, any modified forms of structure or use of mechanical equivalents which may be reasonably included within their scope.

I claim:

1. In a measuring device,
a supporting means,
a temperature responsive means on said supporting means,
said temperature responsive means including a shaft adapted to undergo a predetermined amount of rotational displacement upon a predetermined and corresponding change in temperature,
a power shaft on said supporting means,
means for powering said power shaft,
a cam gear means mounted on said power shaft,
a limiting arm means fixed to said shaft to rotate therewith and being movable inwardly and outwardly with respect to said cam gear means,
an idler arm movably connected to said supporting means,
an idler gear means on said idler arm,
said idler arm being operatively movable connected to said limiting arm means so that the inward position and displacement of said idler arm and idler gear means will be determined by the position and displacement of said limiting arm means,
said cam gear means being positioned on said power shaft to intermittently mesh with said idler gear means between the extreme rotational positions of said idler arm,
a counter mechanism on said supporting means,
and connecting means operatively connecting said idler gear means and said counter mechanism whereby the proportional rotational displacement of said idler gear means by said cam gear means will be recorded when said means for powering said power shaft is energized,
said idler gear means including a first idler gear adapted to mesh with said cam gear means at times and a second idler gear concentrically mounted with said first idler gear and adapted to rotate therewith, said second idler gear being operatively connected to said connecting means.

2. In a measuring device,
a supporting means,
a temperature responsive means on said supporting means,
said temperature responsive means including a shaft adapted to undergo a predetermined amount of rotational displacement upon a predetermined and corresponding change in temperature,
a power shaft on said supporting means,
means for powering said power shaft,
a cam gear means mounted on said power shaft,
a limiting arm means fixed to said shaft to rotate therewith and being movable inwardly and outwardly with respect to said cam gear means,
an idler arm movably connected to said supporting means,
an idler gear means on said idler arm,
said idler arm being operatively movably connected to said limiting arm means so that the inward position and displacement of said idler arm and idler gear means will be determined by the position and displacement of said limiting arm means, said cam gear means being positioned on said power shaft to intermittently mesh with said idler gear means between the extreme rotational positions of said idler arm, a counter mechanism on said supporting means, and connecting means operatively connecting said idler gear means and said counter mechanism whereby the proportional rotational displacement of said idler gear means by said cam gear means will be recorded when said means for powering said power shaft is energized, said cam gear means being comprised of a substantially oval shaped member having gear teeth provided on a portion of its periphery which are adapted to mesh with said idler gear means at times.

3. The device of claim 2 wherein said oval shaped member is secured adjacent one of its ends and one of its sides to said power shaft.

References Cited

UNITED STATES PATENTS

| | | | |
|---|---|---|---|
| 2,320,310 | 5/1943 | Stoddard et al. | 73—339 |
| 2,320,311 | 5/1943 | Myers | 73—339 |
| 2,652,724 | 9/1953 | Hidy | 73—339 |
| 2,668,445 | 2/1954 | Hidy | 73—339 |
| 3,282,105 | 11/1966 | Smith | 73—339 |

S. CLEMENT SWISHER, *Acting Primary Examiner.*

N. B. SIEGEL, *Assistant Examiner.*